Figure 3:
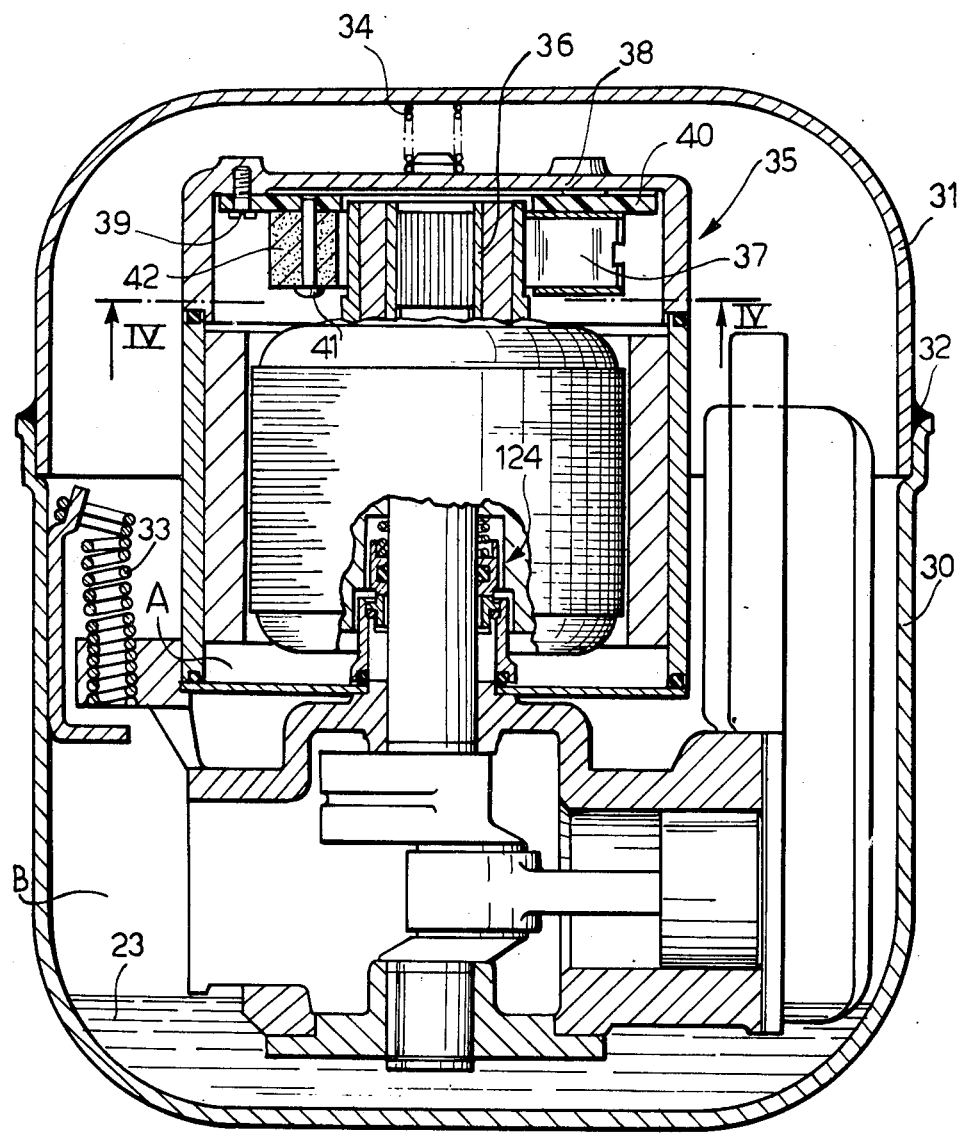

United States Patent [19]

Pittatore

[11] 4,020,645
[45] May 3, 1977

[54] MOTOR-COMPRESSOR UNIT OF THE SEALED TYPE FOR REFRIGERATING APPLIANCES

[76] Inventor: Angiolina Pittatore, Via Ventimiglia 202, Turin, Italy

[22] Filed: Oct. 2, 1975

[21] Appl. No.: 618,861

[30] Foreign Application Priority Data

Oct. 2, 1974  Italy .................................. 69946/74

[52] U.S. Cl. .................................. 62/474; 62/505; 310/54; 310/88; 310/228; 318/254
[51] Int. Cl.$^2$ ......................................... F25B 43/00
[58] Field of Search ..................... 318/254; 417/15; 310/88, 228, 54; 62/85, 303, 474, 505

[56] References Cited

UNITED STATES PATENTS

| | | | |
|---|---|---|---|
| 2,073,830 | 3/1937 | Caley | 310/228 |
| 3,634,873 | 1/1972 | Nishimura | 318/254 |

*Primary Examiner*—Ronald C. Capossela

*Attorney, Agent, or Firm*—Sughrue, Rothwell, Mion, Zinn & Macpeak

[57] ABSTRACT

A motor-compressor unit of the sealed type for refrigerating appliances, characterized by the combination of the following features:
  a. the motor which drives the compressor is a direct current electric motor of the commutator type;
  b. the chamber containing the motor is separated from the chamber containing the compressor by sealing means for realizing a seal tight with regard to the compressor lubrication oil and with regard to the carbon dust generated by the sliding of the brushes of the commutator,
  c. in the chamber containing the motor there are disposed, adjacent the commutator, absorption means for chemically absorbing the products originating from the decomposition of the refrigerating fluid caused by damage the compressor and the other components of the refrigerating appliance.

10 Claims, 4 Drawing Figures

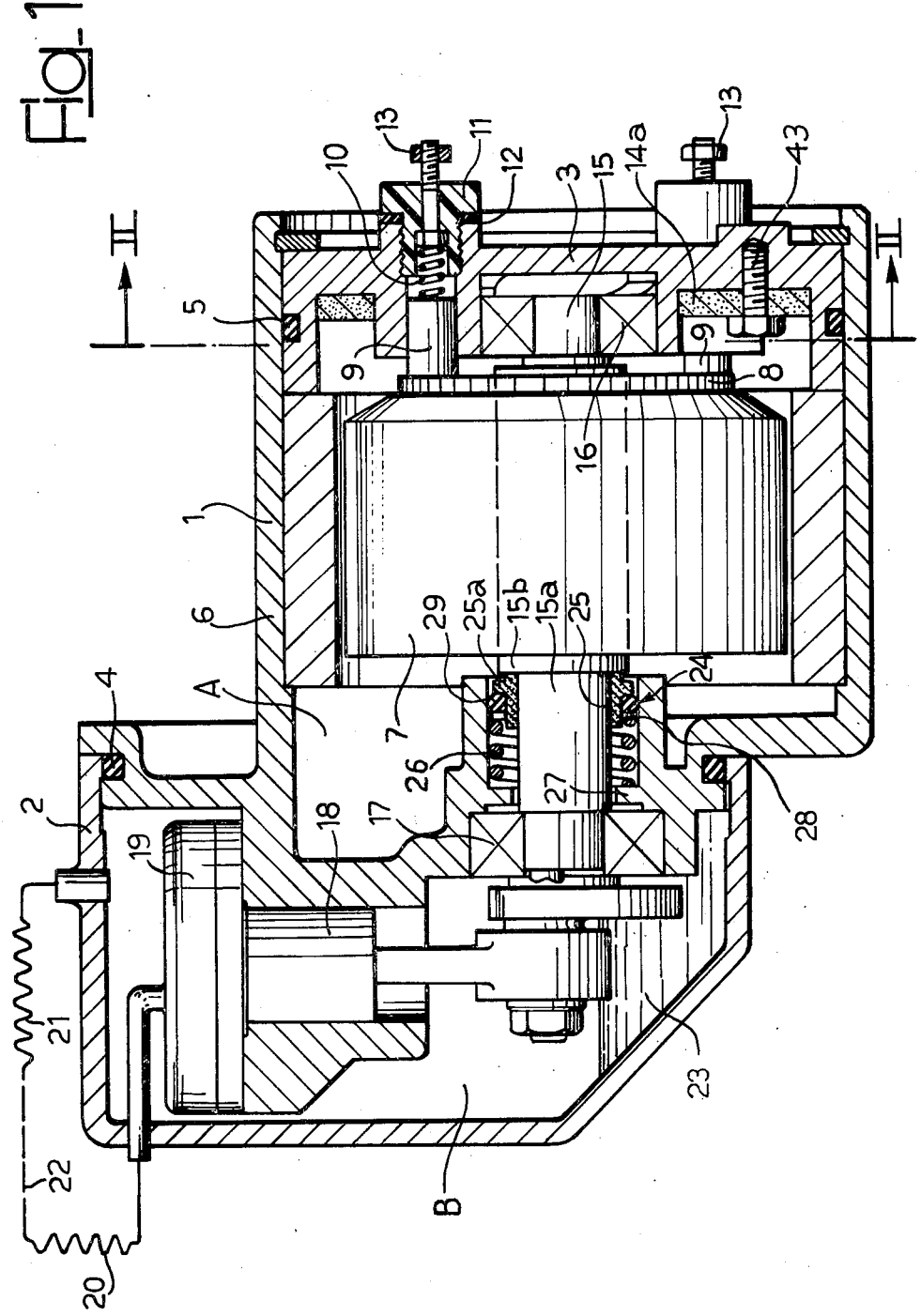

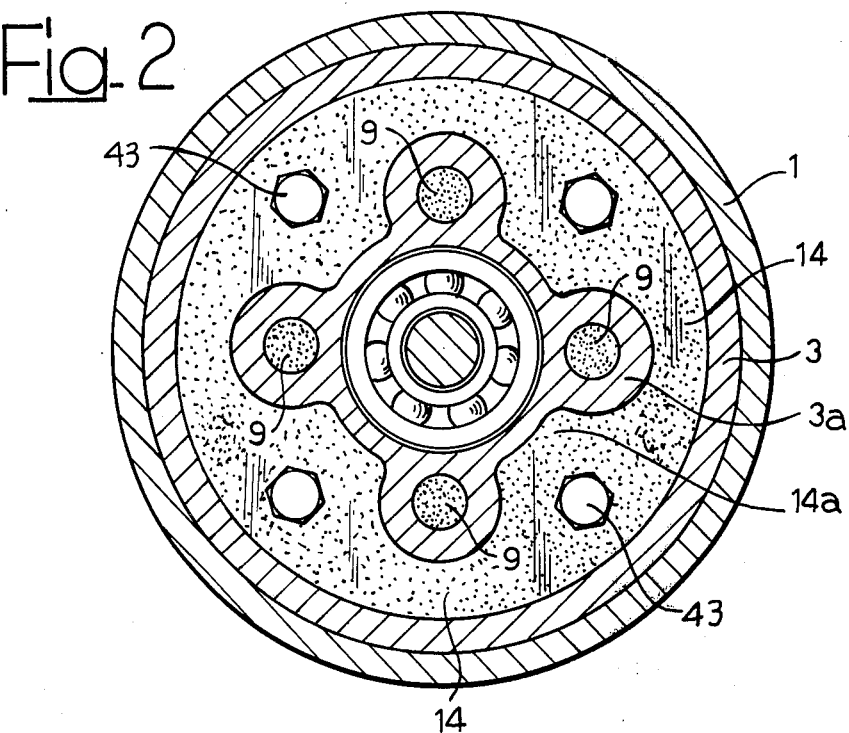
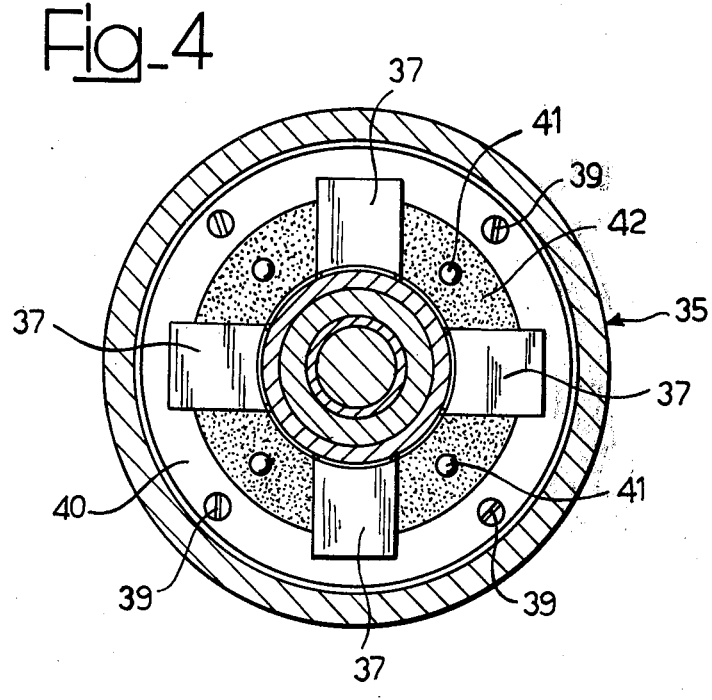

MOTOR-COMPRESSOR UNIT OF THE SEALED TYPE FOR REFRIGERATING APPLIANCES

The present invention refers to motor compressor units of the sealed type for refrigerating appliances.

As is known in such units, the motor and the compressor are contained in a fluid-tight envelope which also contains the lubricating oil of the compressor and the refrigerating fluid. Up till now, in motor- compressor units of the sealed type there has been employed, for driving the compressor, an electric motor of the induction type; all attempts to employ a direct current electric commutator motor in motor compressor units of the sealed type for regrigerating devices have given a negative result for the following reasons:

1. the carbon dust which is generated owing to the brush wear is fed from the compressor to the refrigerating circuit, clogging the lamination system (capillary tube or expansion valves); further, such dust contaminates the oil contained in the compressor chamber compromising the lubrication of the compressor.
2. The sparking provoked by the sliding of the brushes on the commutator decomposes the refrigerating fluid, giving rise to chemically active products, such as chlorine, fluorine and hydrochloric and hydrofluoric acids, susceptible of etching the compressor members.

The present invention has the object of permitting the realization of motor-compressor units of the sealed type for refrigerating appliances, which can be fed with direct current and can therefore find applications in fields, such as air conditioning appliances for motor vehicles, in which up until now it has not been possible to employ sealed units and in which it was necessary to resort to other solutions, which were more costly and less effective.

Accordingly, according to the present invention there is provided a motor-compressor unit of the sealed type for refrigerating appliances characterized by the combination of the following features:
 a. the motor which drives the compressor is a direct current electric motor of the commutator type,
 b. the chamber containing the motor is separated from the chamber containing the compressor by sealing means for realizing a seal tight with regard to the compressor lubrication oil and with regard to the carbon dust generated by the sliding of the brushes of the commutator,
 c. in the chamber containing the motor there are disposed, adjacent the commutator, absorption means for chemically absorbing the products originating from the decomposition of the refrigerating fluid caused by damage the compressor and the other components of the refrigerating appliance.

According to a preferred embodiment of the invention, the absorption means are constituted by at least one plate of strongly electropositive metal, preferably zinc, disposed adjacent to the motor commutator.

The invention will now be more fully described, by way of example only, with reference to the accompanying drawings, in which:

FIG. 1 is an axial section of a motor-compressor unit of the sealed type for refrigerating appliances according to a first embodiment of the invention, FIG. 2 is a transverse section taken along line II—II of FIG. 1, FIG. 3 is a longitudinal secton of a second embodiment of the invention, and FIG. 4 is a section taken along the line IV—IV of FIG. 3.

In the example of FIGS. 1 and 2, the envelope of a motor-compressor unit of the sealed type for refrigerating appliances is constituted by a central part 1 and two end covers 2,3, detachably fixed to the part 1 with the interposition of sealing rings 4,5.

The envelope contains a direct current electric motor, comprising a stator 6, a rotor 7 and a frontal commutator 8 on which slide brushes 9 slidably mounted in tubular appendices 3a which extend axially towards the interior of the cover 3.

The brushes 9 are pushed towards the commutator 8 under the action of springs 10, housed in caps 11 of insulating material, screwed into the cover 3 with the interposition of sealing rings 12. In the insulated caps 11 are inset terminals 13 for connection to the electric feeding circuit.

The reference numeral 14 indicates an annular plate of sintered zinc, having a porous structure, fixed by means of screws 43 to the walls 3. The annular plate 14 is provided with radial appendices 14a which are extended in the spaces between the tubular appendices 3a.

The numeral 15 indicates the horizontal shaft of the electric motor supported by bearings 16 and 17.

The shaft 15 drives in a known manner, by means of a crank connecting rod, the piston 18 of a compressor 19 which causes a refrigerating fluid to circulate in a circuit of a refrigerating appliance, of which FIG. 1 schematically shows the condenser 20, the evaporator 21 and the capillary tube 22 interposed between the condenser and the evaporator.

The reference numeral 23 indicates the lubrication oil of the compressor which fills the bottom of the chamber in which the compressor is placed and by the reference numeral 24 there is indicated a sealing means which seals the motor chamber A from the compressor chamber B.

The sealing means 24 can be of any known type (frontal, radial, or membrane).

In the embodiment of FIG. 1 the sealing means 24 is of the frontal sealing type, and comprises a graphite sleeve 25 mounted with clearance on a portion 15a of the shaft 15. One of the end faces of the sleeve 25 is pressed by the action of a spring 26 against a collar 15b of the shaft 15.

The spring 26 acts at one end against a radial flange 27 of the central part 1 of the envelope of the motor-compressor group and, at the other end, against a radial flange 25a of the sleeve 25 with the interposition of a metal washer 28 and of a sealing O-ring 29.

The above described sealing means prevents the compressor lubrication oil from passing from chamber B to chamber A and the carbon dust which is generated due to the sliding of the brushes 9 on the commutator 8 from passing from chamber A to chamber B.

The sealing means 24 permits a slow passage of the refrigerating fluid from the chamber A towards the chamber B and from the chamber B towards the chamber A as a function of the variations of pressure in the chamber A during the operation of the refrigerating group.

The porous zinc plate has the aim of avoiding contamination of the refrigerating fluid in its passage from chamber B to chamber A by chemically active products originating from the decomposition of the refrigerating fluid due to the sparking the sliding of the brushes 9 on the commutator 8 of the electric motor.

In the case in which the refrigerating fluid is constituted as in most refrigerating appliances of the product known by the name "Freon 12," it has been established that the sparking provoked by the sliding of the brushes gives rise to decomposition products, among which are fluorine and chlorine and, in the presence of traces of humidity, hydrofluoric and hydrochloric acids.

The porous zinc of which the plate 14 is constituted, being a strongly electropositive metal, chemically absorbs such active decomposition products so that they cannot damage the compressor and the refrigerating appliance.

Practical experiments have been effected by the assignee on an automotive vehicle refrigerating appliance generating 1900 units of refrigeration per hour, with an evaporation temperature of +5° C and a condensation temperature of +45° C; said appliance being operated by a sealed motor-compressor unit of the above described type, comprising a 12V, 760 W direct current electric motor rotating at 2900 rpm. The weight of the sinterized zing plate contained in the motor chamber was 60 gms. After 5,000 running hours (corresponding to running of 250,000 kms by an automotive vehicle at an average speed of 50 km/h), a gas-chromatograph analysis of the refrigerating fluid (Freon 12) was effected.

This analysis excluded the presence in the refrigerating fluid of chlorine, fluorine and hydrochloric and hydrofluoric acids.

From a chemical analysis effected on the sinterized zinc plate, it was found that less than 1% of the zinc present was chemically combined with oxygen, fluorine and chlorine giving place to formation of zinc oxyfluoride and zinc oxychloride, solidly adhering to the plate of sinterized material.

In the embodiment according to FIGS. 3 and 4 there is illustrated a motor-compressor unit of the sealed type for refrigerating appliances which differs from that previously described in that the envelope, constituted by two elements 30,31 interconnected by means of soldering at 32, encloses a vertical axis motor-compressor unit resiliently supported i the interior of the envelope by means of springs 33,34 as the motor-compressor units normally used in refrigerating appliances for domestic use.

A direct current electric motor, generally indicated by the numeral 35, is provided with an axial commutator 36 on which slide four radial brushes contained in brush holders 37. The numeral 38 indicates the end wall of the casing of the motor 35, to which is fixed by means of screws 39 an insulating plate 40. To the plate 40 are fixed, by means of rivets 41, in the spaces comprised between the brush holders 37, four plates 42 of sintered zinc, each in the form of a sector.

the operation of the unit illustrated in FIGS. 3 and 4 is the same as that described in connection with FIGS. 1 and 2.

What is claimed is:

1. In a refrigeration system comprising:
   a. an hermetically sealed envelope;
   b. a direct current electric motor of the brush-and-commutator type contained in said hermetically sealed envelope;
   c. a compressor contained in said hermetically sealed envelope and operatively connected to said direct current motor;
   d. sealing means in said hermetically sealed envelope for realizing a tight seal between said direct current electric motor and said compressor with regard to the compressor lubrication oil and with regard to the carbon dust generated by the sliding of the brushes on the commutator;

the improvement comprising absorption means disposed in said hermetically sealed envelope adjacent the commutator of said direct current motor for chemically absorbing the products originating from the decomposition of the refrigerating fluid in said compressor which are liable to damage said compressor and the other component of the refrigerating system.

2. A motor-compressor unit according to claim 1, characterized in that said absorption means are constituted by at least one plate of strongly electropositive metal disposed adjacent the motor commutator.

3. A motor-compressor unit as claimed in claim 2 characterized in that said absorption means are constituted by at least one plate of sintered zinc.

4. A motor-compressor unit according to claim 2, in which said motor has a frontal commutator on which brushes mounted in brush holders directly axially slide, characterized in that said absorption means are constituted by an annular plate of sintered zinc surrounding the brush holders and provided with internal radial appendices extending in the spaces between the brushes.

5. A motor-compressor unit according to claim 2 in which said motor has an axial commutator on which radially disposed brushes are adapted to slide, characterized in that said absorption means are constituted by a plurality of sintered zinc plates which are supported by an insulating plate extending at right angle to the motor axis, said zinc plates being located in the spaces between the brushes.

6. A motor-compressor unit as claimed in claim 1, characterized in that said absorption means are constituted by at least one plate of sintered zinc.

7. A motor-compressor unit according to claim 6, in which said motor has a frontal commutator on which brushes mounted in brush holders directly axially slide, characterized in that said absorption means are constituted by an annular plate of sintered zinc surrounding the brush holders and provided with internal radial appendices extending in the spaces between the brushes.

8. A motor-compressor unit according to claim 6 in which said motor has an axial commutator on which radially disposed brushes are adapted to slide, characterized in that said absorption means are constituted by a plurality of sintered zinc plates which are supported by an insulating plate extending at right angle to the motor axis, said zinc plates being located in the spaces between the brushes.

9. A motor-compressor unit according to claim 1 in which said motor has a frontal commutator on which brushes mounted in brush holders directly axially slide, characterized in that said absorption means are constituted by an annular plate of sintered zinc surrounding the brush holders and provided with internal radial appendices extending in the spaces between the brushes.

10. A motor-compressor unit according to claim 1 in which said motor has an axial commutator on which radially disposed brushes are adapted to slide, characterized in that said absorption means are constituted by a plurality of sintered zinc plates which are supported by an insulating place extending at right angle to the motor axis, said zinc plates being located in the spaces between the brushes.

* * * * *